Figure 1:
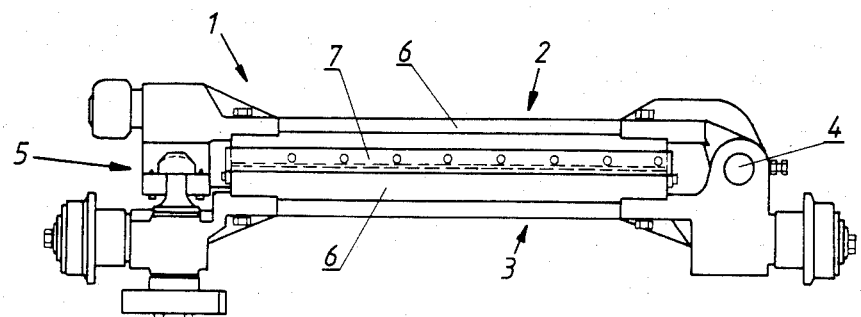

United States Patent [19]
Haas, Sr. et al.

[11] Patent Number: 4,503,759
[45] Date of Patent: Mar. 12, 1985

[54] BAKING PLATE

[76] Inventors: Franz Haas, Sr., Gerstlgasse 25, A-1210 Wien; Franz Haas, Jr., Kreuzgasse, A-2100 Leobendorf; Johann Hass, Seitenweg 4, A-3400 Klosterneuburg, all of Austria

[21] Appl. No.: 411,556

[22] Filed: Aug. 25, 1982

[30] Foreign Application Priority Data

Sep. 10, 1981 [AT] Austria .................. 3921/81

[51] Int. Cl.³ ............................................ A47J 37/00
[52] U.S. Cl. .................................. 99/380; 99/422; 249/179
[58] Field of Search ............... 99/372–384, 99/422, 426; 249/179, 183, 184; 425/469

[56] References Cited
U.S. PATENT DOCUMENTS 1,915,211  6/1933  Balton .................. 99/380
4,308,790  1/1982  Haas et al. ............. 99/380

Primary Examiner—Billy J. Wilhite
Attorney, Agent, or Firm—Kurt Kelman

[57] ABSTRACT

A baking plate is provided, which is adapted to cooperate with a second baking plate to define a cavity for receiving dough to be baked. The baking plate has on one side a generally flat dough-treating surface and on the opposite side a rear surface. The rear surface of the baking plate is formed with at least one channel by which the flexural stiffness of the baking plate is reduced. At least one adjustable stressing device is connected to said rear surface of said baking plate on opposite sides of said channel and operable to subject said baking plate to an adjustable initial bending stress in such a manner that said channel is contracted to an adjustable extent transversely to the longitudinal direction of said channel and that an adjustable convex camber is imparted to said dough-treating surface.

74 Claims, 29 Drawing Figures

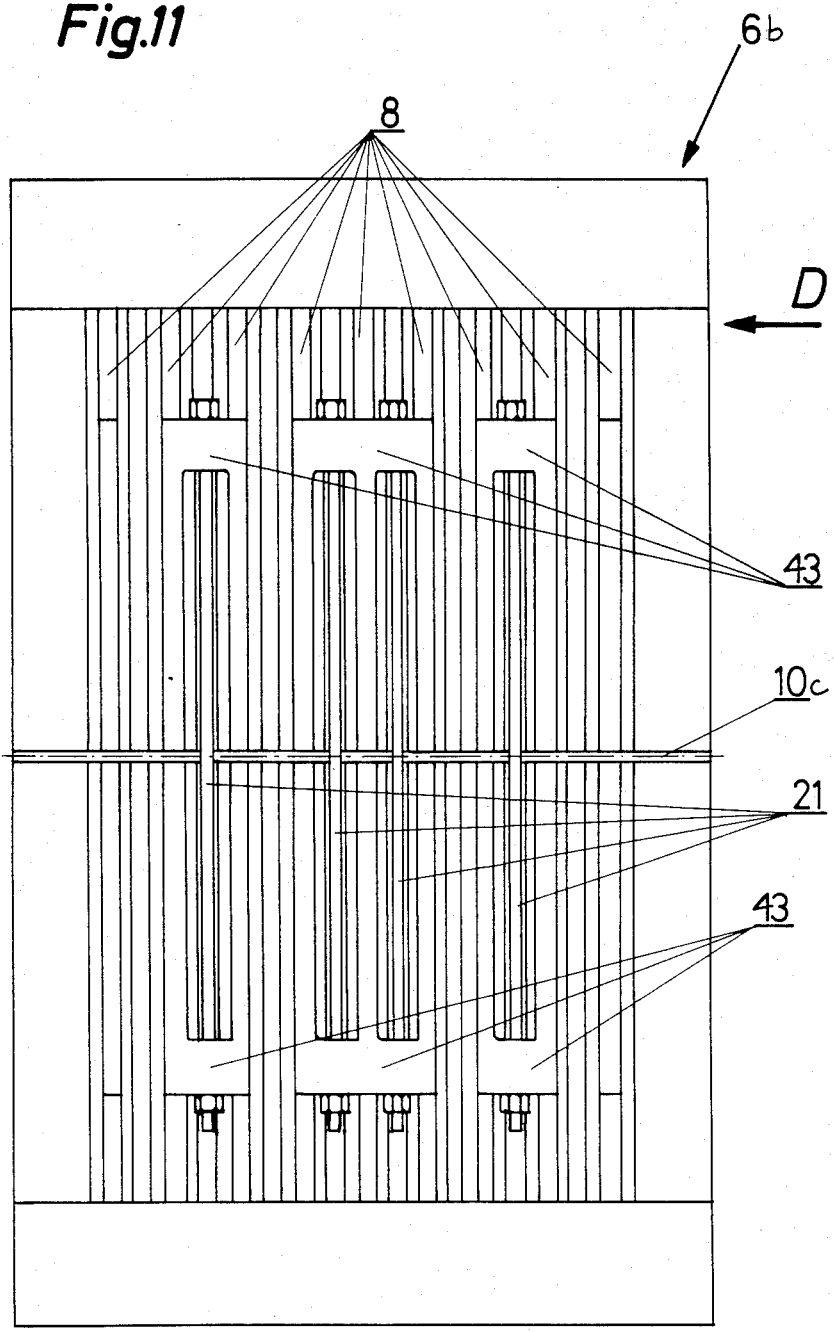

BAKING PLATE

This invention relates to a baking plate for use in baking tongs of a wafer-baking oven.

Various baked wafer products made by machine are known, inter alia, in the food-processing industry. These baked wafer products are placed on the market in a filled or unfilled state and are generally known as luxury foods. Such products of the wafer-baking industry are, e.g., wafer cones, wafer cups, wafer plates, flat wafer discs, low hollow wafers, hollow sticks, wafer rolls, icecream cones, filled wafers, icecream wafers, small filled wafer sticks, wafer slices and the like. These baked wafer products made by baking a wafer dough are crisp and brittle and break easily. They are baked to be as dry as possible and have a very low moisture content.

The various baked wafer products can be made in various ways. Some wafer products are baked in their final shape. This applies, e.g., to wafer cones, wafer cups, wafer discs, low hollow wafers and the like.

In the manufacture of other baked wafer products, a wafer sheet or an endless strip is baked first and is given its final shape when it is still soft after the baking operation. In that final shape the baked wafer product is permitted to cool and to assume a crisp and brittle consistency. Examples of such baked wafer products are sugar-containing icecream cones, hollow sticks, sugar-containing wafer rolls and the like.

Other kinds of baked wafer products are made in that a plurality of wafer sheets are baked, cooled, coated with cream, and stacked to form a wafer block. That cream-filled wafer block is subsequently cut into small handy pieces of uniform size, which are then packaged in units consisting of one or more pieces, possibly in vacuum packages, and are placed on the market in that form.

Various baked wafer products may be provided with coatings consisting, e.g., of sugar or chocolate, or may contain various filling materials, such as icecream, various other creams, chocolates or the like.

The wafer products described hereinbefore differ from waffles, which are usually baked by housewives in waffle irons and constitute a soft baked product, which is similar to rolls or pancakes. These waffles made by housewives do not resemble at all the above-mentioned baked wafer products of the wafer industry as regards consistency and use.

Those industrially made wafers which are baked in their final shape, such as wafer cones, wafer cups, wafer figures and the like, on the one hand, and individual wafers, which are coated with cream and subsequently assembled to form a wafer product, such as flat wafers, wafer sheets, shallow hollow wafers, or the like, on the other hand, are made in wafer-baking ovens, which in most cases are automatically operated. These wafer-baking ovens contain baking tongs, which comprise a mold each and are circulated in the oven through a baking chamber and through a head section, in which baking tongs are opened and subsequently closed so that the dough can be poured into the molds and the baked wafer can be removed when the baking time has passed.

The baking molds of the baking tongs may be of different types depending on the nature of the wafer to be made. For instance, a baking mold for making wafer sheets or shallow hollow wafers consists of two baking plates, each of which has a dough-treating surface that is subsequently flat except for engravings for baking wafer sheets or recesses for baking shallow hollow wafers. These baking plates are provided on their sides with bars which close the sides of the cavity defined by the wafer mold when it is closed. Each baking tongs comprise an upper jaw and a lower jaw, which are hingedly connected and consist of or carry respective baking plates. One face of each baking plate constitutes the dough-treating surface. The rear surface of the baking plate may be arranged to be contacted by hot gases or the baking plate may be provided near its rear surface with embedded electric heating elements. When the baking tongs are closed, the baking plates are parallel to each other and exactly in register with each other and the dough-treating surfaces of the baking plates face each other and define between them a small gap, which constitutes a cavity in which a wafer sheet is to be baked.

When it is desired to bake a wafer sheet, the baking tongs are opened and liquid wafer dough is poured onto the heated lower baking plate, which is horizontally oriented. The baking plates are then swung toward each other and the baking tongs are closed. The dough contained in the gap between the dough-treating surfaces of the baking plates is heated to the baking temperature by the heated baking plates and the evaporation of the water contained in the dough gives rise to a steam pressure, which urges the two baking plates apart.

Because the upper and lower jaws of baking tongs are hingedly connected near one side of the baking plates and are locked to each other on the opposite side, each of the two baking plates behaves like a beam, which is supported at two points and loaded by a load that is uniformly distributed over the length of the beam. The baking plates are thus loaded by the steam pressure in the dough contained between the baking plates. This loading results in an elastic deformation of the baking plates, which is similar to the deflection of a beam, so that the baking plates are cambered in such a manner that the gap between the baking plates increases at the center of the baking plates whereas it remains unchanged at those edges of the baking plates which are near the hinge of the baking tongs and near the locking means of the baking tongs.

In the previous practice, the baking plates have been dimensioned to resist that deformation and a compromise has been adapted because a baking plate which will not be deflected would be very expensive. For this reason a certain deflection has been tolerated. It has been found, however, that the material of the baking plates is subject to fatigue so that the deflection of the baking plates will increase in the course of time above the tolerated initial value. Besides, the customers desire to make wafer sheets of increasing precision so that that design concept involves increasing costs and can no longer be justified.

Moreover, the problem involved in the camber of the baking plates is rendered more and more critical by the trend toward the making of larger wafer sheets.

The previously known baking tongs and baking sheets could be used to make wafer sheets up to a size of 350×500 millimeters. In order to reduce the cost per slicer package of the labor required for the operation of the machines of a wafer production line for the production of pakaged cream-filled wafer slices and in order to reduce the percentage of waste which is obtained as the wafer blocks are cut into slices in the wafer production line, the wafer-mixing industry desires to make larger wafer sheets.

The following problems are involved in the making of larger wafer sheets:

If the baking plates designed to be so stiff that the elastic deformation of the baking plates caused by the steam pressure will be negligibly small so that the wafer sheets made with such baking plates have the same thickness at the center and at the edges, then these baking plates and any carrying frame which may be required for them will be so heavy that the wafer-baking ovens provided with such baking plates are no longer economical owing to the high cost of manufacturing the baking tongs and the need for a high strength of the structure of the wafer-baking oven.

If the thickness of the baking plates and of any carrying frame which may be required is reduced to a value which is economically justifiable, the steam pressures which are applied will result in such a strong deflection of the baking plates that the wafer sheet will be much thicker at its center than at its edges. In a stack of wafers these thickness differences will be cumulative so that a slice cut from a wafer block near its edge will be much lighter in weight than a slice which has been cut out at the center of the same wafer block or the slice which has been cut out at the center will contain much less filling material. These differences detract from the quality of the product. For these reasons the thickness difference throughout the wafer sheet should not exceed 0.1 mm.

Another problem involved in the making of relatively large wafer sheets is the fact that the dough is inadequately degassed during the baking process. Because in larger baking plates the steam escape bars are spaced a larger distance from the center of the baking plate, an escape of an adequate quantity of steam from the center of the wafer-baking mold will not be possible so that higher steam pressures and a larger deformation will be obtained at the center of the baking plates. Owing to these deformations, the layer of dough will be thicker at the center of the wafer-baking mold than at its edges. That non-uniform distribution of the dough has the result that the dough at the edges of the wafer-baking mold will be degassed much more rapidly because the dough at the edges forms a thinner layer and the closely adjacent steam escape bars promote the degassing. As a result, the degassing of the dough at the center of the wafer-baking mold is adversely affected so that the pressure at the center of the baking tongs is increased and with it the camber of the baking plates.

In order to alleviate these problems arising in the baking of large wafer sheets, it is known to provide the dough-treating surfaces of the baking plates of baking tongs with a camber which is equal and opposite to the elastic deformation of the baking plates resulting from the steam pressure so that the steam pressure applied in the closed wafer-baking mold during the baking process will eliminate the camber of the dough-treating surfaces.

The manufacture of a baking plate having a cambered dough-treating surface is highly expensive and the provision of the camber gives rise to problems regarding the engraving of the dough-treating surface. Besides, the camber of the dough-treating surface of a baking plate decreases in the course of time as a result of the fatigue of the material of the baking plate so that the camber of the dough-treating surface will then no longer be sufficient to compensate the deflection of the baking plate, particularly the permanent deformation of the baking plate which results from the fatigue of the material during a very long use.

If the baking plate is to be provided with a camber, e.g., by a grinding operation, the deflection of the baking plates to be expected in use must be ascertained before the baking plates are made. This is not possible in most cases, particularly because the deflection will highly depend on the composition of the dough as this will influence the pressure conditions in the baking tongs.

It is an object of the invention to eliminate the disadvantages which have been pointed out and to provide a baking plate which permits the making of larger wafer sheets or larger shallow hollow wafers and by which the problems which are due to the deflection of the baking plate during the baking process and to the permanent deformation of the baking plate resulting from the fatigue of its material are eliminated.

In a baking plate, particularly a self-supporting baking plate, for use in baking tongs of a wafer-baking oven, which baking plate has a dough-treating surface which is substantially flat, except for engravings for baking wafer sheets or recesses for baking shallow hollow wafers or the like, and a rear surface, which faces away from the dough-treating surface and is provided, if desired, with ribs or recesses, this object is accomplished according to the invention in that said rear surface of said baking plate is formed with at least one channel by which the flexural stiffness of the baking plate is reduced, and the baking plate is provided on its rear with one or more adjustable stressing devices for adjustably contracting the at least one channel transversely to its longitudinal direction so as to impart to the dough-treating surface of the baking plate an adjustable convex camber and to subject the baking plate to an adjustable initial bending stress, which is preferably sufficient to at least offset the decrease of the flexural stiffness of the baking plate which is due to the at least one channel.

With this design, the baking plate can be provided with an initial camber corresponding to the elastic deformation imparted to the baking plate during the baking process by the formation of steam, and that initial camber can be re-adjusted from time to time so that the permanent deformation resulting in such baking plate in the course of time owing to its alternating stress can be compensated and such baking plate will have a much longer life than the previously known baking plates.

When the baking plate according to the invention is in a new state, it will be provided only with the initial stress or initial camber that is required to compensate the deflection of the baking plate caused by the steam pressure applied during the baking process in the closed baking tongs and will be inserted with that initial stress and initial camber into the wafer-baking oven. After a time of use corresponding to the life of a conventional baking plate, the permanent deformation of the baking plate caused by the fatigue of the material of the plate has become so large that the wafer sheets or shallow hollow wafers made with that baking plate will have an excessively large thickness variation. The stressing device or stressing devices of the baking plate according to the invention may then be restressed so that the channel or channels will be further contracted and the camber of the baking plate will be increased. After that restressing, the dough-treating surface of the baking plate is again substantially flat again or has again the initial camber so that the products baked with that baking plate will be equal to those obtained with the new baking plate. That baking plate can now be used again until the fatigue of the material of the baking plate has resulted in such a large permanent deformation of the baking plate that the thickness variation of the wafer sheets or shallow hollow wafers made with the baking plate is just permissible. At that time, the baking plate according to the invention may be restressed again and will then be again in the same state as the new baking plate. Because the baking plate according to the invention can be re-adjusted frequently, its life is virtually unlimited.

The provision of the channel in the baking plate or the subsequent formation of the baking plate with the channel results in a reduction of the flexural stiffness of the baking plate. That reduction in flexural stiffness is required to permit a cambering of the dough-treating surface by an operation of the stressing device and is compensated by such operation so that the prestressed or restressed baking plate according to the invention will have the same flexural stiffness as a corresponding baking plate which has no such channel. But the stressing device may be designed to impart to the baking plate according to the invention a flexural stiffness which is higher than that of a corresponding baking plate having no such channel and stressing device. This will result in an additional stiffening of the baking plate also in the longitudinal direction of the channel, which will be of advantage particularly when existing baking plates are subsequently provided with channels and stressing devices.

Within the scope of the invention the baking plate has between the bottom of the recess and the dough-treating surface a residual thickness amounting to at least 5% of the thickness of the baking plate inclusive of any ribs provided on the rear of the baking plate. That design permits a large reduction of the flexural stiffness of the baking plate by the provision of the channel and yet ensures that the baking plate will reliably withstand the stresses to which it is subjected during the baking process.

It is desired to permit the baking plate to be adapted to the requirements which depend on the nature and shape of the wafers to be made by the baking plate and on the nature of the baking tongs in which the baking plate is to be used. For this purpose it is a feature of the invention that a baking plate having a plurality of contractible channels has the same remaining thickness between the bottom of each channel and the dough-treating surface. This will be of great advantage particularly in the making of wafer sheets. In another embodiment of a baking plate having a plurality of contractible channels the remaining thickness of the baking plate between the bottom of each of the several channels and the dough-treating surface may be different and may preferably increase from channel to channel in the direction from the center to the edge of the baking plate. With such a design, the flexural stiffness of the baking plate may be reduced to different degrees over its surface.

The channels according to the invention may be formed by machining in a conventional new baking plate or in an existing, used baking plate. This concept permits a simple, cost-saving change of the previously employed processes of manufacturing baking plates and greatly simplifies the subsequent formation of the channels. In order to permit a uniform reduction of the flexural stiffness of the baking plate along the channel, it is a feature of the invention that the bottom of the channel is substantially parallel to the dough-treating surface. If the baking plate is to be provided with a varying camber along the channel when wafers of a certain kind are to be made or in a certain used baking plate, it will be desirable in accordance with the invention to vary the remaining thickness of the baking plate between the bottom of the channel and the dough-treating surface along the channel.

According to a further feature of the invention, the bottom-bisecting longitudinal center plane of the channel is substantially at right angles to the dough-treating surface. In that case the baking plate can be designed in a very simple manner. In an alternative embodiment, said bottom-bisecting longitudinal center plane may include an acute angle with the dough-treating surface. This will be of advantage if the baking plate according to the invention is to be used in a gas-fired wafer-baking oven because a baking plate provided with such a channel will have no protruding portions which would obstruct the flame.

Also in accordance with the invention, a baking plate may be formed with two contractible channels which have bottom-bisecting longitudinal center planes which are inclined in mutually opposite directions to the dough-treating surface. In that case, a common stressing device may be used for both channels and the two channels may be very closely spaced apart so that they will influence the local shape of the camber of the baking plate.

In a baking plate having a large camber, the latter should be uniformly distributed over the baking plate. This is accomplished according to the invention in that in a baking plate having a plurality of contractible channels the bottom-bisecting longitudinal center planes of said channels are parallel to each other.

According to a further feature of the invention, in a baking plate which is substantially rectangular in a top plan view the contractible channels extend substantially throughout the length and/or width of the baking plate. In dependence on its size, such a baking plate can be weakened in the region in which it has the highest section modulus. Each contractible channel may extend substantially throughout the length and/or width of the baking plate. This will be of special advantage in baking plates in which the section modulus is substantially uniform throughout the length and/or width of the baking plate. In an alternative embodiment of the invention, each contractible channel may extend only along part of the length and/or across part of the width of the baking plate. With that design the reduction of the flexural stiffness of the baking plate which is due to the contractible channels may be adapted to the change of the local section modulus along the length and/or across the width of the baking plate. For this purpose it may be desirable to stagger the contractible channels.

In a baking plate which is substantially rectangular in a top plan view, it is a feature of the invention that the contractible channels extend substantially parallel to one of the boundary edges of the baking plate. With that design, the initial camber of the baking plate or the camber which is subsequently imparted to the baking plate may be adapted to a deflection of the baking plate in a direction which is substantially at right angles to the boundary edge of the baking plate.

In a baking plate which is substantially rectangular in a top plan view it will be possible to compensate also a deflection of the baking plate in a direction which is not parallel or normal to one of the boundary edges of the baking plate if the contractible channels extend substantially at an oblique angle to one of the boundary edges of the baking plate.

In a baking plate which is substantially rectangular in top plan view it is another feature of the invention that the remaining thickness of the baking plate between the bottom of the or each contractible channel is 0.01 to 0.2 times, preferably 0.02 to 0.05 times the width or length of the baking plate. With that design the remaining thickness can be selected in view of the shape or material of the baking plates, whether the baking plate has been made of grey cast iron and is formed on its rear surface with individual ribs or recesses or the baking plate has been made of steel and has a smooth rear surface. This feature is particularly applicable to self-supporting baking plates.

According to another feature of the invention, a baking plate having a plurality of contractible channels, particularly a plurality of such channels aligned on a straight line, has a stressing device associated with all of said channels. With that design the initial camber of the baking plate can be adjusted in a simple manner. This will be of special advantage if a uniform camber is desired in the baking plate along the contractible channels.

According to another feature of the invention, one stressing device or a plurality of stressing devices may be associated with each contractible channel. In a baking plate which has suffered a non-uniform deformation owing to a fatigue of its material, for instance, that design permits each stressing device to be operated so as to provide in the baking plate the initial stress which corresponds to the local camber. Also with that design, a non-uniform initial stressing of the baking plate can be achieved in that some stressing devices are operated to a larger extent than others.

The local camber produced by a single stressing device can be distributed over a larger area of the baking plate if, in accordance with the invention, a single stressing device is associated with a plurality of juxtaposed contractible channels.

According to a further feature of the invention, the stressing device bridges the associated contractible channel and is anchored in the rear surface of the baking plate on both sides of the channel. This design will permit the use of a simple stressing device. Because the stressing device is anchored in the rear surface of the baking plate, the baking plate will be cambered as the stressing device is operated to contract the recess or channel.

According to another feature of the invention, the stressing device comprises tension screws, which extend through the side faces of the contractible channel and through optional insert plates or the like which have been inserted on edge into the channel. With that design, the contractible channel can be subsequently formed in an existing baking plate without an increase of its overall height. Also with that design, the existing baking plates of an existing wafer-baking oven may be replaced by baking plates according to the invention without a need for alterations of the wafer-baking oven. When the insert plates are inserted into the contractible channel, the amount of the camber can be controlled in a simple manner by the selection of the thickness of the insert plates and the tension screws can then be tightened until the side faces of the contractible channel are in surface contact with the insert plates. This will ensure an exact adjustment of the camber of the baking plate, particularly of its dough-treating surface, without need for special devices for controlling the force with which the tension screws are tightened. Besides, the insert plates occupy a major portion of the cross-section of the contractible channel so that the latter will not obstruct the flow of heat in the baking plate. This will be of special advantage if the baking plate according to the invention is used in a gas-fired wafer-baking oven. The tension screws and the insert plates cooperate to compensate the reduction of the flexural stiffness of the baking plate which is due to the provision of the channel.

According to another feature of the invention, the stressing device comprises two anchoring members, which are adapted to be removably held in anchoring recesses formed in the rear surface of the baking plate and extending along the contractible channel, which extends between the anchoring recesses, and at least one bridge member which bridges the contractible channel and interengages with the anchoring members and is operable to change the spacing of the anchoring members. That design affords the advantage that the anchoring members are positively held in the rear surface of the baking plate so that there will be a reliable transmission of forces from the anchoring member to the baking plate. These forces are exerted on the anchoring members by the bridge member.

In accordance with the invention, the anchoring members may consist of cylindrical rods, which are removably held in grooves, which are formed in the rear surface of the baking plate and have a bottom that is defined by an arc of a circle. If the grooves have a sufficiently large depth, the anchoring members can be locked in the grooves without need for a fixation of the anchoring members to the baking plates by screw-threaded or other means.

According to another feature of the invention the anchoring members may consist of substantially parallelepipedic blocks and be held in grooves that are rectangular in cross-section and formed in the rear surface of the baking plate. These grooves in the rear surface of the baking plate may extend across the ribs provided on the rear surface of the baking plate and may be made in a simple manner by planing or milling and the anchoring members may be screwed to the bottom of the groove with screws.

Also in accordance with the invention, the anchoring members may consist of anchoring bars, which extend along the contractible channel. That design permits a stiffening of the baking plate in the longitudinal direction of the channel. That stiffening may be increased, e.g., in that the anchoring bars are screw-connected to the rear surface of the baking plate at a plurality of points.

According to a further feature of the invention, the anchoring blocks or anchoring bars held in the grooves in the rear surface of the baking plate have rounded edges which face away from each other and from the dough-treating surface of the baking plate and extend parallel to the contractible channel. In this way, a surface for engagement by the bridge member is provided and the rounded edge will ensure a reliable engagement by the bridge member even when the channel has been contracted and the anchoring bar or block has been canted by the contracting of the channel.

In accordance with the invention the bridge member may simply consist of a tension screw, which extends through the anchoring members.

Also in accordance with the invention the tension screw may extend in a recess which is formed in the rear surface of the baking plate and extends transversely to the associated contractible channel. With that arrangement, the tension screw can be accommodated within the overall height of the baking plate.

In a baking plate having ribs on its rear surface, it is a feature of the invention that the tension screw extends between two adjacent ribs on the rear surface of the baking plate.

According to a further feature of the invention, only two cylindrical rods or two anchoring bars extend along a contractible channel. This design is very simple and simplifies the insertion of the rods or anchoring bars into the corresponding grooves in the rear surface of the baking plate. This will be of advantage particularly in baking plates having contractible channels extending throughout the length or width of the baking plate because only few parts must then be mounted on the baking plate.

In accordance with another feature of the invention, only a single tension screw is associated with each pair of anchoring members. This will be particularly desirable if the anchoring members are short and used with very short contractible channels.

In accordance with another feature of the invention, the anchoring members of each pair are interconnected by a plurality of tension screws. Where relatively long anchoring members are used, that feature ensures a more uniform distribution of the stressing forces over the length of the anchoring members. Besides, such pairs of anchoring members together with the tension screws may be preassembled to form a stressing device which is then inserted into the grooves in the rear surface of the baking plate.

Also in accordance with the invention each tension screw may be provided with left-hand screw threads at one end and with right-hand screw threads at its opposite end. In that case the tension screw can simply be turned in one sense to move one of the anchoring members toward the other.

Also in accordance with the invention, the bridge member is provided on that side which faces the anchoring members with two surfaces which engage the anchoring members and are formed on the lateral boundary of a recess in the bridge member or on two mutually opposite projections of the bridge member. By such a bridge member the forces required to contract the channel will be transmitted to the anchoring members directly by the engaging surfaces.

In accordance with the invention, the engaging surfaces of the bridge member may be inclined toward the dough-treating surface and toward each other. When such a bridge member is used in combination with cylindrical rods or with the rounded edges of the anchoring members, the forces required to operate the stressing device will be effectively transmitted.

According to another feature of the invention, the inclined engaging surfaces of the bridge member engage the anchoring members at side faces thereof which are parallel to said engaging surfaces.

Also in accordance with the invention, the bridge member is adapted to be moved relative to the anchoring members until an adjustable stop is engaged, which is preferably provided on the bridge member. With that design the adjustment of the stressing device can be exactly controlled.

According to a further feature of the invention, the adjustable stop is formed by the recess formed in the bridge member and by one or more shims, which are detachably mounted in the recess formed in the bridge member and are engageable with the anchoring members. With that design, an exactly controlled camber can be imparted to the baking plate in that the bridge member is forced against the baking plate until the stop or the shims is or are engaged. In that case the camber imparted to the baking plate by the bridge member will be independent of the force with which the bridge member is forced against the baking plate.

In an alternative embodiment, the adjustable stop may be formed by projections of the bridge member or by those portions of the rear surface of the baking plate which are engageable by said projections and/or by the shims disposed between the projections and the rear surface of the baking plate.

According to another feature of the invention, the stressing device consists of two anchoring recesses, which extend along a contractible channel, and a bridge member which bridges the contractible channel and has projections which extend into said anchoring recesses and engage those boundary surfaces of the anchoring recesses which are adjacent to the contractible channel, and the bridge member is adapted to be nondisplaceably secured to the rear surface of the baking plate. With that design, the stressing device has a particularly small overall height and the bridge member engages directly the rear surface of the baking plate.

According to another feature of the invention, those boundary surfaces of the anchoring recesses which are engageable by the bridge member may be inclined to the dough-treating surface. This will permit a transmission of forces from the bridge member to the baking plate over larger surfaces.

According to another feature of the invention those boundary surfaces of the anchoring recesses which are engageable by the bridge member are convexly curved. Whereas only a linear contact will then be obtained if the engaging surfaces of the bridge member are flat, it will be ensured that the engagement will not be changed when the engaged boundary surfaces of the anchoring recesses are canted as the contractible channel is contracted.

To improve the transmission of forces from the bridge member to the rear surface of the baking plate, the projections of the bridge member have engaging surfaces which are inclined toward each other.

According to another feature of the invention the bridge member is adapted to be secured to the rear surface of the baking plate by screws which are locked against rotation when they have been tightened. The desired initial stress or initial camber is then imparted to the baking plate according to the invention in that the bridge member is secured to the baking plate.

According to a further feature of the invention, the stressing device comprises replaceable shims, which are inserted between the bridge member and the rear surface of the baking plate between the two anchoring recesses and constitute an adjustable stop for limiting the movement of the bridge member toward the dough-treating surface. The initial stress or initial camber of the baking plate will then depend on the thickness of the shim and can be adjusted and re-adjusted by an exchange of the shims.

According to a further feature of the invention, a single bridge member extends along a contractible channel. That bridge member can then be adjusted as is required for the associated channel and the design of the bridge member can be selected in view of the associated contractible channel.

According to another feature of the invention the stressing device which bridges the contractible channel and particularly the bridge member of said stressing device extends throughout the length of the contractible channel. This design will result in a stiffening of the baking plate in the longitudinal direction of the contractible channel and the latter will be protected from any combustion gases acting on the rear surface of the baking plate.

According to another feature of the invention, the stressing device bridges two juxtaposed contractible channels and the camber imparted by the stressing device to the dough-treating surface influences the shape of the baking plate.

Also in accordance with the invention, the stressing device comprises a bridge member which is secured to the rear surface of the baking plate between the two juxtaposed contractible channels and extends laterally beyond the two contractible channels and is also secured to the rear surface of the baking plate on the outside of each of said contractible channels, and replaceable shims are disposed between those portions of the bridge member which extend laterally beyond the contractible channels or recesses and the adjacent portions of the rear surface of the baking plate. In that case, a single stressing device can be used to impart different initial stresses to the baking plate on opposite sides of the stressing device if shims of different thicknesses are used on both sides of the stressing device. If shims of equal thickness are used on both sides of the stressing device, a somewhat smaller camber can be imparted to the baking plate under the stressing device.

According to a further feature of the invention, the stressing device may consist of a beam, which is anchored on the rear surface of the baking plate on both sides of the contractible channel, and one or more spacers, which are disposed between said beam and the rear surface of the baking plate beside the contractible channel. In that case the initial camber or initial stress of the baking plate will depend on the effective height of the spacers. The spacers may simply consist of bolts of various heights or of other interposed elements.

In accordance with the invention the camber imparted to the dough-treating surface by the stressing device may be adjusted by the provision of replaceable inserts which are disposed on edge in the contractible channels and limit the extent to which the channels can be contracted. Where these inserts are provided, the stressing device can be highly prestressed and the resulting camber of the baking plate will not depend on the forces by which the stressing device has been operated. Besides, the contractible channels will be filled so that a higher temperature rise of the dough-treating surface of the baking plate adjacent to the contractible channel by the baking atmosphere entering the channel will be prevented. If the inserts disposed in the contractible channels have the same length and height as the channel, a disturbance of the heat flow in the baking plate by the channel will be virtually prevented; such disturbance may otherwise occur.

Figure 2:
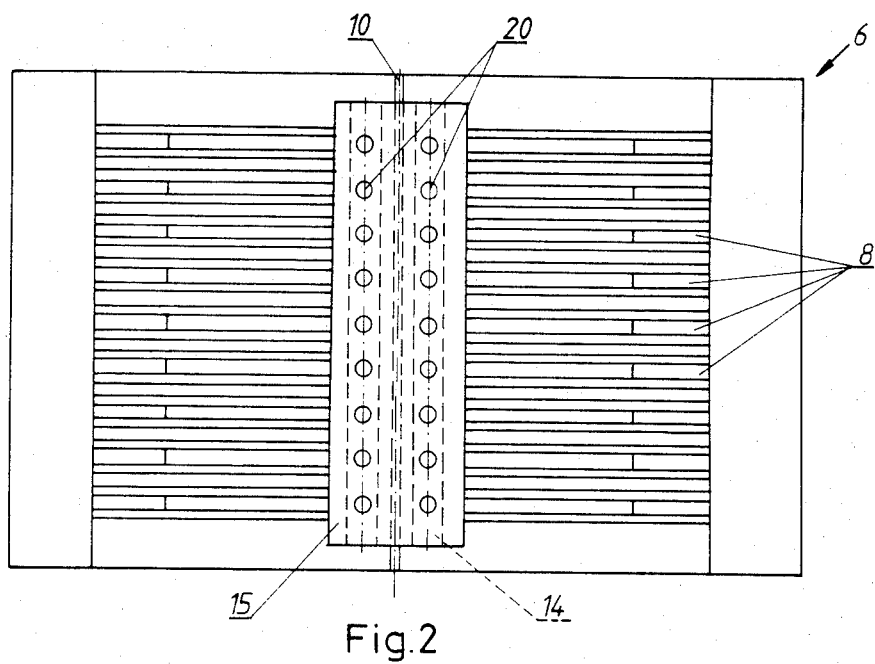
Figure 3:
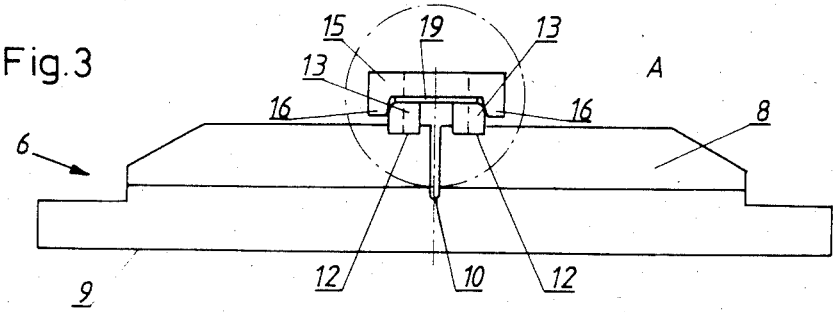
Figure 4:
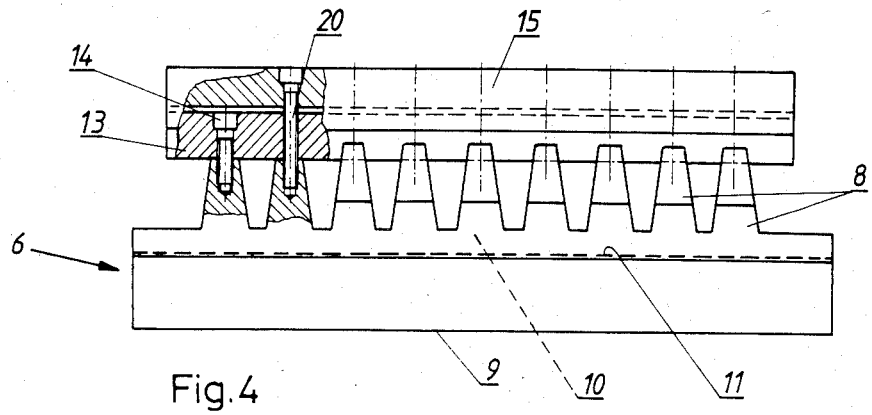
Figure 5:
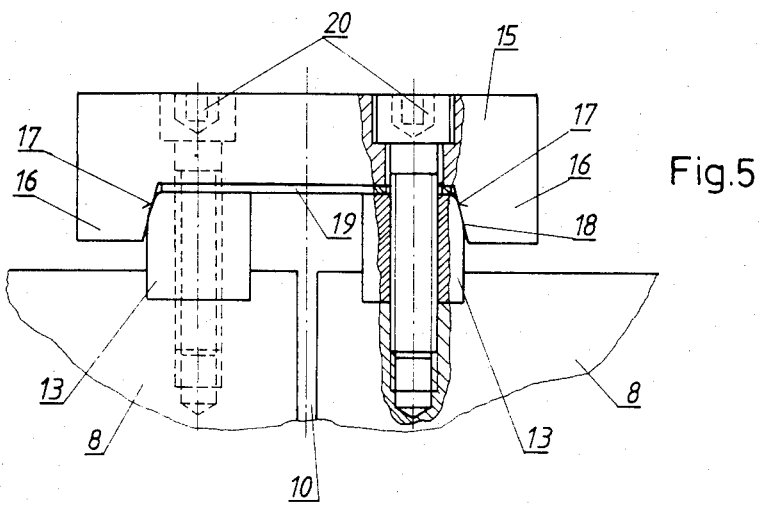
Figure 6A:
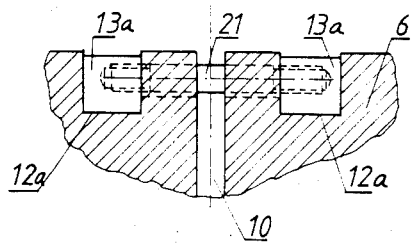
Figure 6B:
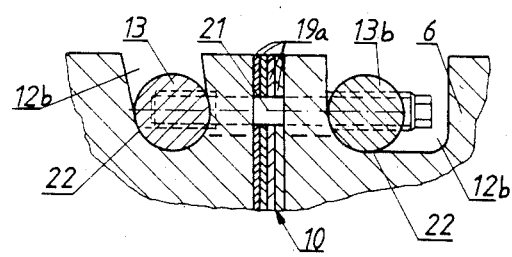
Figure 7:
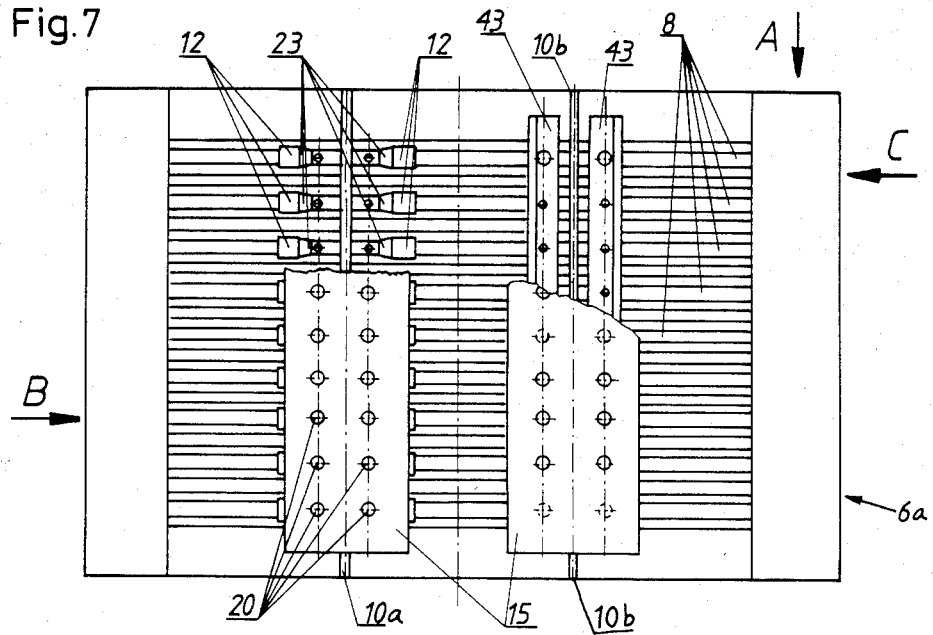
Figure 8:
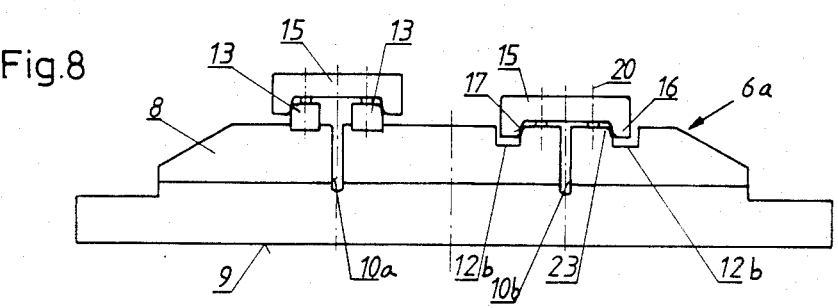
Figure 9:
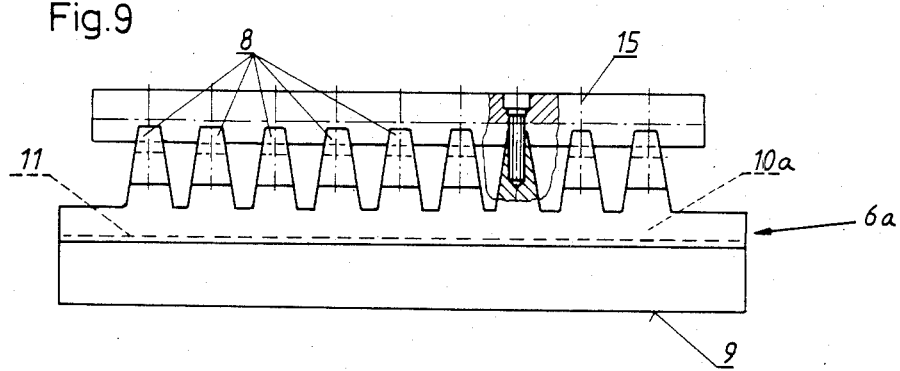
Figure 10:
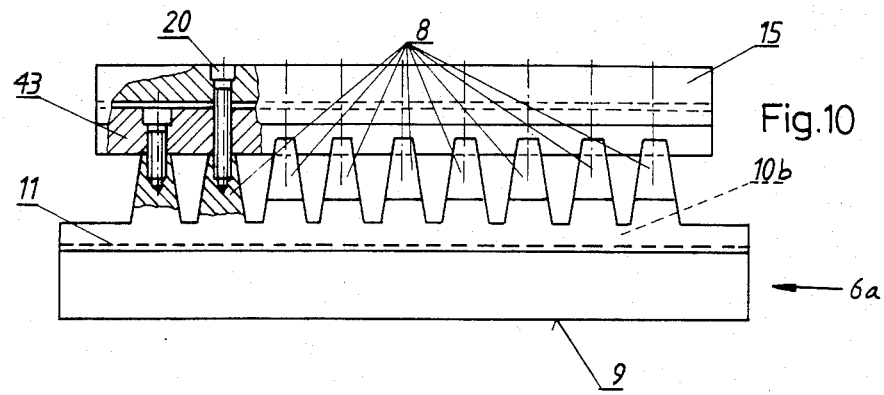
Figure 12:
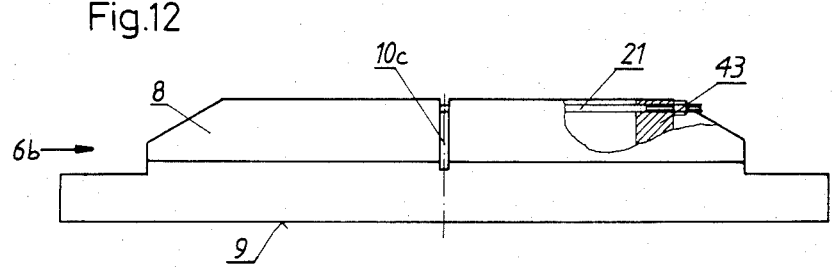
Figure 13:
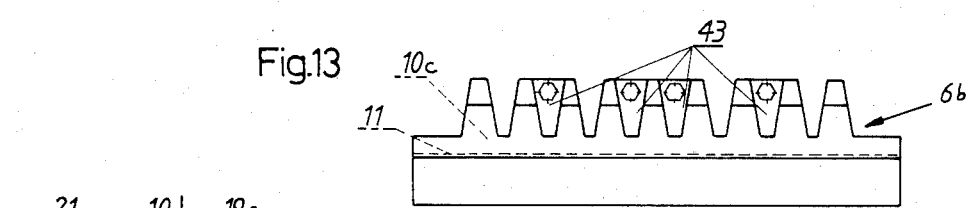
Figure 14:
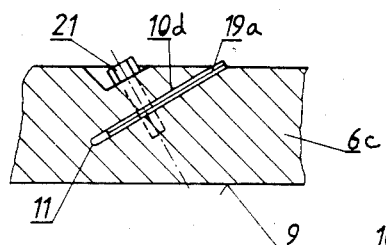
Figure 15:
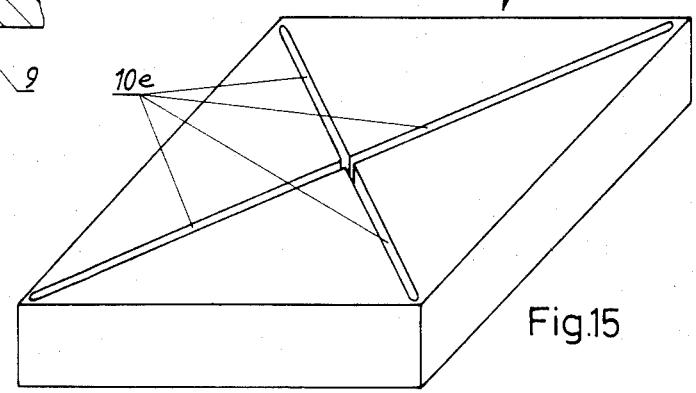
Figure 16:
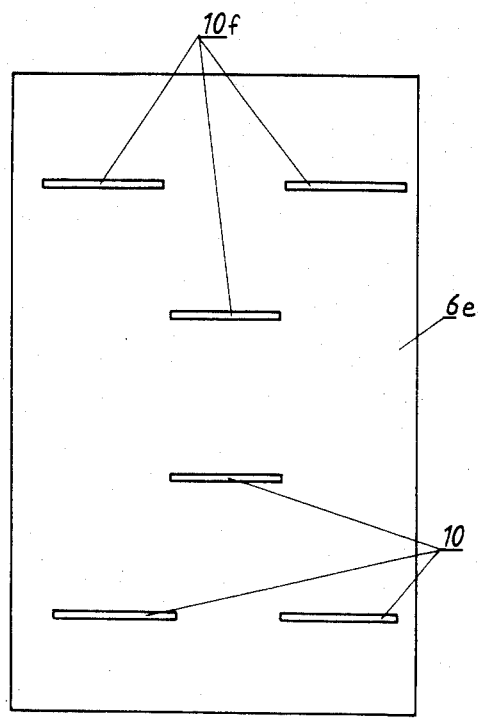
Figure 17:
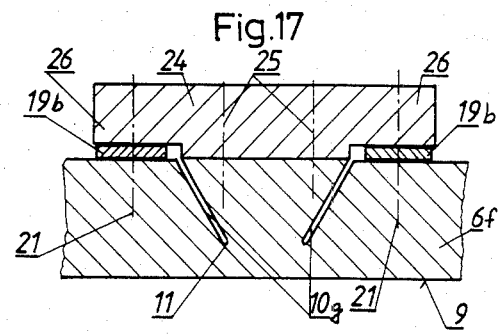
Figure 18:
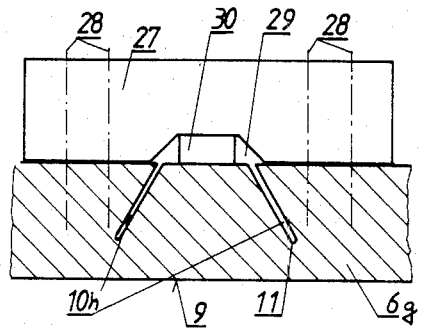
Figure 19:
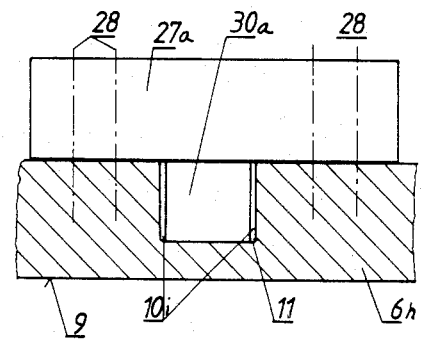
Figure 20:
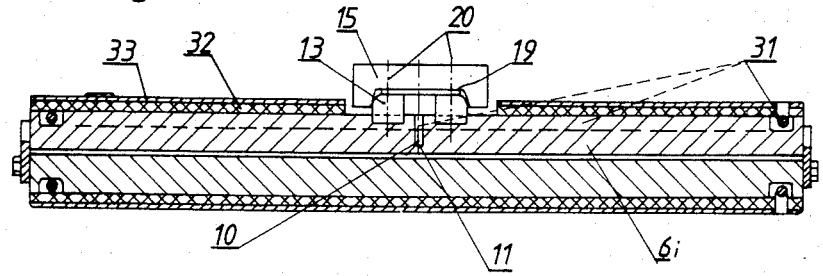
Figure 21:
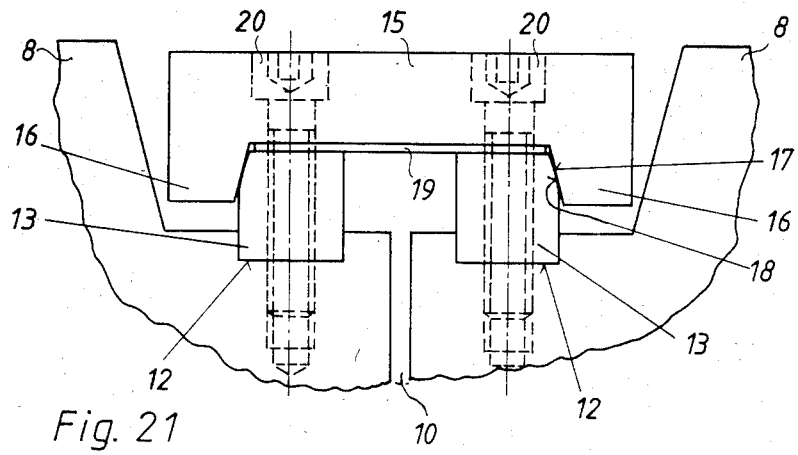
Figure 22:
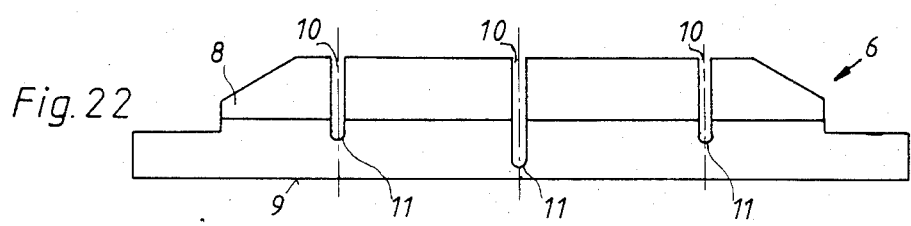
Figure 23:
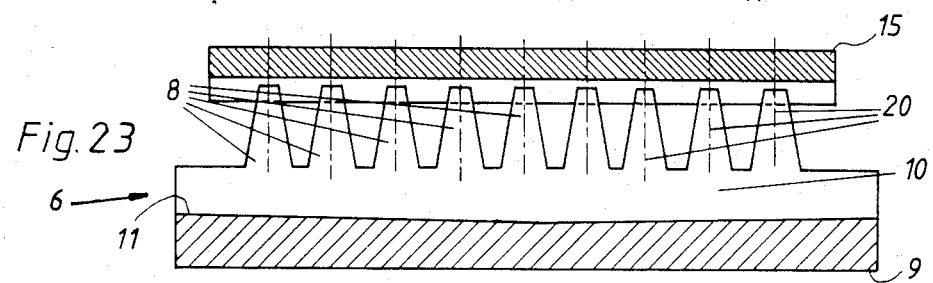
Figures 24, 25, 26:
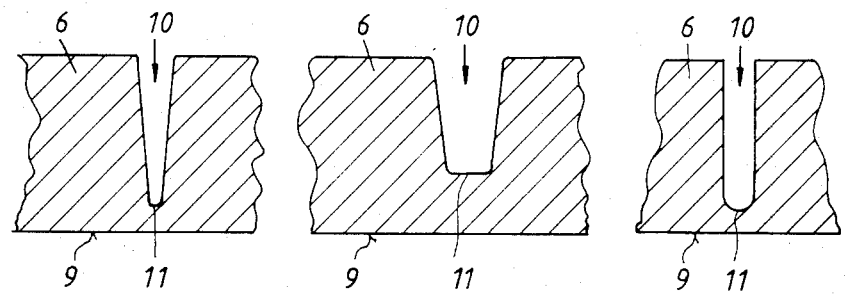
Figure 27:
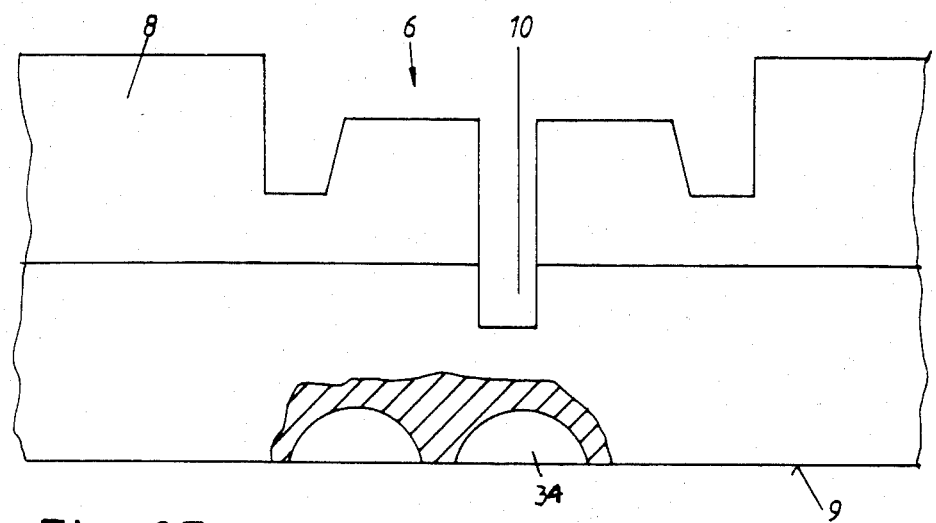
Figure 28:
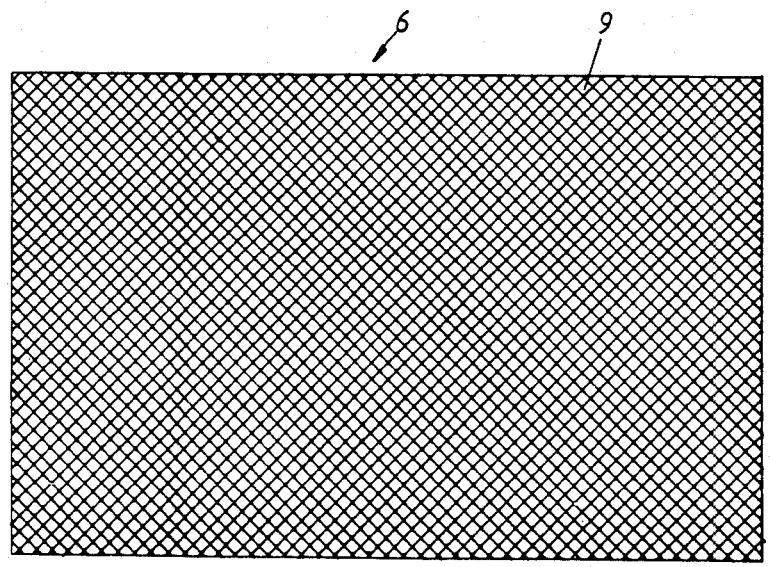

Further features and advantages of the invention will now be explained more fully with reference to illustrative embodiments shown on the drawings, in which:

FIG. 1 is an end view showing baking tongs which comprise self-supporting baking plates, FIG. 2 is a top plan view showing a first embodiment of the baking plate according to the invention, FIG. 3 is a front elevation showing the baking plate of FIG. 2, FIG. 4 is a side elevation showing the baking plate of FIG. 2, FIG. 5 shows a detail of FIG. 3 on a larger scale, FIGS. 6a and 6b are views which are similar to FIG. 5 and show additional embodiments of the baking plate according to the invention, FIG. 7 is a top plan view showing another embodiment of the invention, FIG. 8 is a front elevation showing the baking plate of FIG. 7 viewed in the direction of the arrow A in FIG. 7, FIG. 9 is a side elevation showing the embodiment of FIG. 7 viewed in the direction of the arrow B in FIG. 7 and illustrating an embodiment of the stressing device, FIG. 10 is another side elevation showing the embodiment of FIG. 7 viewed in the direction of the arrow C in FIG. 7 and illustrating another embodiment of the stressing device, FIG. 11 is a top plan view showing another embodiment of the invention, FIG. 12 is a front elevation showing the embodiment of FIG. 11 viewed in the direction of the arrow D in FIG. 11, FIG. 13 is a side elevation showing the embodiment of FIG. 11, FIG. 14 is a sectional view showing another embodiment of the invention, FIG. 15 is an axonometric view showing another embodiment of the invention, FIG. 16 is a top plan view showing another embodiment of the invention, FIG. 17 is a sectional view showing a portion of a baking plate according to the invention, FIGS. 18 and 19 are views showing partly in section two additional embodiments of the invention, FIG. 20 is a sectional view showing another embodiment of a baking plate according to the invention, FIG. 21 is a view which is similar to FIG. 5 and shows another embodiment of a baking plate according to the invention with a stressing device which is accommodated in a recess formed in the rear surface of the baking plate, FIG. 22 is a longitudinal sectional view showing a baking plate having three channels of different depths provided in accordance with the invention, FIG. 23 is a transverse sectional view showing a baking plate according to the invention and formed with a channel which has a bottom that is inclined to the dough-treating surface of the baking plate, the section being taken on a plane extending along the channel, FIGS. 24 to 26 are respective sectional views showing different embodiments of recessed regions provided in the baking plate in order to reduce its flexural stiffness, FIG. 27 is a fragmentary side elevation, partly in section, showing a baking plate in which the dough-treating surface has recesses for baking hollow wafers, and FIG. 28 is a top view of an engraved dough-treating surface of a baking plate for baking wafer sheets.

As is apparent from FIG. 1, baking tongs 1 comprise an upper jaw 2 and a lower jaw 3, which are interconnected at one side edge by a hinge 4 and are held together at the opposite side edge by locking means 5 when the baking tongs are in the closed position shown in FIG. 1. In the embodiment shown in FIG. 1, the upper jaw 2 and the lower jaw 3 comprise respective self-supporting baking plates 6, which in the closed baking tongs enclose a cavity. On the side edges which connect those side edges that are provided with the hinge 4 and the locking means 5, the cavity is closed by bars 7, which may be secured to one of the baking plates and are formed with recesses permitting of an escape of steam from said cavity. Wafer sheets or shallow hollow wafers can be baked in said cavity. The self-supporting baking plates 6 may be made, e.g., of gray iron and may be formed on their rear surface with ribs 8.

The ribs provided on the rear surface of the baking plate may constitute a grid or the rear surface may be formed with a plurality of recesses.

Instead of baking plates provided with ribs on their rear surface it is possible within the scope of the invention to use baking plates which have a substantially flat rear surface or which are equipped for being electrically heated.

In the embodiment of the invention shown in FIGS. 2 to 5, the baking plate 6 according to the invention is provided on its rear surface with ribs 8, and its opposite surface constitutes the dough-treating surface 9. The ribs 8 are parallel to the length of the baking plate 6, i.e., they extend in the direction from the hinge 4 to the locking means 5. At the center of its length, the baking plate 6 is formed in its rear surface with a channel 10, which extends throughout the width of the baking plate and has a bottom which is substantially parallel to the dough-treating surface 9. The channel 10 is open on the rear of the baking plate and extends through all ribs 8 provided on the rear surface of the baking plate. Each rib 8 is formed with two indentations 12, which are disposed on opposite sides of the channel 10 and aligned in the direction of said channel. Two anchoring members 13 are provided on opposite sides of the channel 10 and received by the indentations 12, which have such a cross-sectional shape that the anchoring members 13 interlock with the baking plate in the indentations 12. The indentations 12 in the ribs 8 constitute two recesses, each of which receives one of the two anchoring members 13, which consist of anchoring bars. The two anchoring bars protrude from the rear surface of the baking plate and are rounded on those longitudinal edges which are disposed outside the ribs 8 and face away from each other. The anchoring bars are secured by screws 14 to each rib (FIG. 4). A C-shaped bridge member 15 is mounted on the anchoring members and bridges the channel 10. The bridge member 15 is formed on both sides with projections 16, which have confronting wedge surfaces, which include equal and opposite acute angles with the bottom-bisecting longitudinal center plane of the channel 10 (FIG. 5). The two wedge surfaces 17 of the bridge member 15 engage the rounded longitudinal edges of the anchoring members 13 or the cambered outer side faces 18 thereof. The two projections 16 of the bridge member 15 define a recess, into which the two anchoring members 13 extend. Shims 19 are detachably disposed between the rear surfaces of the anchoring members 13 and the bridge member 15, particularly the bottom of the recess that is defined by the projections 16. The bridge member 15 is forced against the anchoring members 13 by screws 20, which extend through the bridge member and the anchoring members 13. The bridge member 15 extends along a major part of the length of the channel 10 and by the wedge faces 17 provided on the projections 16 engages the anchoring members 13 and particularly their cambered outer side faces 18 throughout the length of the bridge member 15. An initial stress is imparted to the baking plate 6 and its dough-treating surface 9 is cambered in that the screws 20 are tightened to force the bridge member 15 under initial stress against the rear faces of the anchoring members 13 with the shims 19 interposed. As the screws 20 are tightened, the wedge surfaces 17 of the bridge member 15 force the two anchoring members 13 toward each other so that the channel 10 is contracted in width and a camber is imparted to the dough-treating surface 9. When it is desired to increase that camber, it will be sufficient to replace the shims 19 by thinner ones so that the bridge member 15 can be forced to a larger extent toward the dough-treating surface 9 and the wedge surfaces 17 will force the anchoring members 13 more closely together until the thinner shims 19 have been clamped between the bridge member 15 and the anchoring members 13.

As is apparent from FIGS. 6a and 6b, the anchoring members 13a may be accommodated in anchoring recesses 12a which are formed in the rear surface of the baking plate 6 and have a depth in excess of the height of the anchoring members 13. In that case, the anchoring members 13a may be substantially parallelepipedic and the bridge member may consist of a tension screw 21, which is provided with right-hand screw threads on one end portion and with left-hand screw threads on the opposite end portion and has been screwed into bores formed in the anchoring members 13a and having mating screw threads. This is shown in FIG. 6a. The tension screw 21 can be rotated by a wrench applied to a polygonal, e.g., hexagonal portion with which the tension screw 21 is formed close to one end thereof. In another embodiment, shown in FIG. 6b, the baking plate 6 is formed in its rear surface with grooves 12b having a bottom which is rounded on the side facing the channel 10, and anchoring members 13b which are circular or oval in cross-section are accommodated in said grooves 12b. The two anchoring members 13b of FIG. 6b are also interconnected by one or more tension screws 21. To limit the camber imparted to the dough-treating surface 9, the channel 10 contains one or more inserts 19a, which limit the extent to which the channel 10 can be contracted by a rotation of the tension screws 21. These screws may be accommodated in grooves of the baking plate or between ribs of the baking plate.

In the embodiment shown in FIGS. 7 to 10, a baking plate 6a which is rectangular in a top plan view is formed in its rear surface with two parallel channels 10a and 10b and a separate stressing device is associated with each of said channels. The channel 10a provided on the left of the center of the baking plate in FIG. 8 has associated with it a stressing device which is similar to the stressing devices which have been described with reference to FIGS. 1 to 5. Recesses 12b extend on opposite sides of and along the channel 10b disposed on the right of the center of the baking plate of FIG. 8. Those side faces 23 of the recesses 12b which are adjacent to the channel 10b are rounded toward the channel 10 and engageable by a bridge member 15, which has projections 16 protruding into the recesses 12b. The bridge member 15 is secured to the rear surface of the baking plate by screws 20 and has wedge faces 17 which engage the side faces 23 of the recesses 12b so that the extent to which the projections 16 of the bridge member 15 are forced into the recesses 12b will determine the extent to which the channel 10b will be contracted. The extent to which the bridge member 15 is forced into the recesses 12b as the screws 20 are tightened and the extent to which the channel 10b is contracted will depend on the force by which the screws 20 are rotated, e.g., by means of a torque wrench or the like. As an alternative, shims may be provided which serve as stops limiting the extent to which the bridge member 15 can be moved toward the dough-treating surface of the baking plate. These shims may be disposed, e.g., in the recesses 12b so that the projections 16 of the bridge member 15 will strike against the shims as the bridge member is forced against the rear surface of the baking plate. As another alternative, inserts may be provided between the bottom of the recess, which is formed in the bridge member 15 and defined by the projections, and the rear surfaces of the lands left in the baking plate between the two recesses 12b. As a further alternative, the extent to which the channel 10b can be contracted can be controlled by inserts placed into the channel 10b. In that embodiment of the stressing device, a single bridge member 15 is provided, which extends into a plurality of recesses formed in the rear surface of the baking plate on each side of a channel and is forced against the rear surface of the baking plate by two screws 20 connecting the bridge member 15 to each rib 8. In that case the baking plate will be additionally stiffened in the longitudinal direction of the channel. This stiffening will be increased by the shims clamped between the bridge member 15 and the rear surface of the baking plate. If such an increased stiffening is not desired in a given case, the bridge member 15 may be divided into C-shaped sections, each of which is screwed to only one rib so that the bridge member 15 is replaced by a series of C-shaped sections, which are arranged one behind the other and are not interconnected.

Such C-shaped sections may also be used with anchoring bars or anchoring members of the kind shown in FIGS. 5 and 6b and may be mounted on the anchoring bars like the bridge member 15 shown in FIG. 5. To ensure that the stressing device will not protrude above the rear surface of the baking plate, the anchoring members or anchoring bars may be arranged on a lower level in a recess of the rear surface of the baking plate and the stressing device may comprise C-shaped sections which are disposed between adjacent ribs on the rear surface of the baking plate and do not protrude the rear surface of the baking plate when the C-shaped sections have been forced against the anchoring members and with their inclined wedge surfaces engage the rounded or cambered side faces of the anchoring members. If the anchoring members are circular or oval in cross-section, the surface of the anchoring members will be engaged by the C-shaped sections. In that case too, the forcing of the C-shaped sections against the anchoring members may be limited by inserts, which serve as stops and are arranged either in the channel or between the anchoring members and the C-shaped sections or between the C-shaped sections and the side faces of the rib which is formed on the rear surface of the baking plate and arranged adjacent to the C-shaped section.

To ensure that a stressing device as shown in FIG. 3 or FIG. 8 will not protrude above the rear surface of the baking plate, the ribs may be formed with recesses which constitute a channel extending along the channel 10 and having a bottom which is formed with the recesses and the channel whereas the ribs protrude above the bridge member 15. Such an arrangement is shown in FIG. 21 for a stressing device as shown in FIG. 3.

In the embodiments of a baking plate 6b according to the invention which are shown in the right-hand portion of FIG. 8 and in FIGS. 11 to 13 the abutments for the bridge member do not consist of anchoring members which are subsequently inserted into recesses provided for that purpose in the rear surface of the baking plate but are integrally formed with the baking plate and particularly with the ribs 8 thereof. In the embodiment shown in FIGS. 11 to 13 the abutments bridge recesses between two adjacent ribs and are formed with through bores. Such abutments are provided on both sides of the channel 10c and tension screws extend through the bores of mutually opposite abutments. Each tension screw 21 has at one end a head, which bears on the outside surface of one abutment 43. The tension screw 21 is tightened by means of a nut, which bears on the outside surface of the opposite abutment. When the tension screw 21 has been tightened, that nut is suitably held against rotation so that a loosening of the tension screw will be avoided. The nut may be held against rotation by a lock nut or the tightening nut may consist of a castle nut, which is locked to the tension screw by means of a split pin. The abutments 43 which are integral with the ribs 8 may be provided in each recess formed between two adjacent ribs or only in some of these recesses. In the embodiment shown in FIGS. 11 to 13, these abutments are disposed in the second, fourth, fifth and seventh of these recesses.

In the embodiments described hereinabove, the bottom-bisecting longitudinal center plane of the channel extends substantially at right angles to the dough-treating surface 9 of the baking plate. Alternatively, the bottom-bisecting longitudinal center planes of the channels may include an acute angle with the dough-treating surface 9 of the baking plate. This may be necessary for reasons of design. The stressing devices used with such channels may be the same as those described with reference to FIGS. 2 to 13.

FIG. 14 shows an embodiment of a baking plate 6c according to the invention which has a generally flat rear surface, which is formed with a channel 10d that extends in the longitudinal direction of the baking plate and at an acute angle to the dough-treating surface 9 of the baking plate 6c. The stressing device associated with that channel consists of a tension screw 21, which extends through the channel 10 transversely thereto and bears on the rear surface of the baking plate. The head of that screw may bear on a surface which defines a recess in the rear surface of the baking plate or on a projection formed on the rear surface of the baking plate. In this embodiment the contraction of the channel 10d is limited by inserts 19a, which are disposed in the channel 10d. If this embodiment of the invention is used with an existing baking plate which has a rear surface that is substantially parallel to the dough-treating surface 9, the head of the tension screw 21 will suitably bear on the rear surface of the baking plate by means of an interposed wedge. This concept may also be adopted with baking plates formed with ribs on their rear surface.

The baking plate is prestressed to impart to the baking plate a camber in a sense which opposes the deformation which is caused by the steam pressure during the baking operation. For this purpose the channels formed in the rear surface of the baking plate are designed in dependence on the shape to which the baking plate would be deformed if it were not prestressed. For instance, in a baking plate 6d which is rectangular in a top plan view the channels 10e may extend along the diagonals, as is shown in FIG. 15. Alternatively, a plurality of relatively short channels 10f may be provided in the rear surface of the baking plate 6e and these channels 10f may be staggered, as is shown in FIG. 16. A baking plate which is rectangular in top plan view can be given a camber also in its longitudinal direction if it is formed with staggered channels 10 which extend substantially in the direction of the width of the baking plate and these channels are contracted to different extents because inserts differing in thickness are used and/or the stressing devices are forced against the baking plate with different forces.

In the embodiment of the invention shown in FIG. 17 the baking plate 6f has two juxtaposed channels 10g, which include an acute angle with the dough-treating surface 9. The two channels 10g extend parallel along the length of the baking plate and their bottom-bisecting longitudinal center planes include acute angles with the dough-treating surface 9. In a transverse sectional view of the baking plate, the two channels 10g converge from the rear surface of the baking plate toward the dough-treating surface. A bridge member 24 is secured by means of screws 25 to that portion of the rear surface of the baking plate which is disposed between the two channels 10g and has side portions 26, which extend outwardly beyond the channels and have bottom surfaces spaced above the rear surface of the baking plate. Shims 19b are replaceably mounted between the bottom surfaces of the side portions 26 and the rear surface of the baking plate. The opening formed by each channel 10g in the rear surface of the baking plate is disposed between the adjacent shims 19b and a central portion of the bridge member. That central portion is secured to the rear surface of the baking plate between the openings of the two channels 10g. Each side portion 26 of the bridge member 24 is secured to the rear surface of the baking plate by tension screws 21. When the tension screws 21 are not tightened, the distance from the bottom of the side portions 26 to the rear surface of the baking plate exceeds the thickness of the shims 19b so that the tightening of the tension screws 21 has the result that the baking plate which has been weakened by the provision of the channel 10g is bent transversely to the longitudinal direction of the channel 10g until the shim 19b is clamped between the bottom of the side portions 26 and the rear surface of the baking plate and the bridge member 24 is under initial stress. In that embodiment too, the shims 19b provided between the bottom of the side portions 26 and the rear surface of the baking plate may be replaced by inserts which are provided in the channels 10 and limit the extent to which the channels 10g can be contracted.

In the embodiment of the braking plate 6g shown in FIG. 18, a single bridge member is used to contract two juxtaposed channels 10h, which in a transverse sectional view of the baking plate include acute angles with the dough-treating surface 9 and diverge toward the latter from the rear surface of the baking plate. A beamlike bridge member 27 is anchored on the rear surface of the baking plate by means of screws 28 outside that portion of the rear surface of the baking plate which is disposed between the openings of the channels 10h, which face a recess 29 formed in the bottom surface of the central portion of the beam 27. A spacer 30 is disposed between the bottom of the recess 29 and that portion of the rear surface of the baking plate which is disposed between the openings of the two channels 10h. That spacer 30 has a thickness which exceeds the distance from the bottom of the recess 29 to the rear surface of the baking plate when the screws 28 have not been tightened. When the screws 28 are tightened to force the beam 27 against the rear surface of the baking plate, a camber will be imparted to that portion of the baking plate which is disposed between the two channels 10h so that the larger thickness of the spacer 30 is compensated. Alternatively, the central portion of the beam 27 may be provided with a projection, which in response to a tightening of the screws 28 will depress that portion of the baking plate which is disposed between the two channels 10h.

In another embodiment of the invention, the baking plate is formed in its rear surface with an elongated recess or a wide groove and with channels opening into said recess or groove, which receives a spacer which substantially completely fills the recess or groove with the exception of small lateral clearances. The spacer protrudes above the rear surface of the baking plate. A substantially platelike beam is then applied to the rear surface of the baking plate so that the underside of the beam rests on the spacer. That beam is forced against the rear surface of the baking plate so that the spacer is displaced relative to those portions of the baking plate which are disposed outside the channels until the beam engages the baking plate outside the channels. As a result, the baking plate is cambered to an extent which depends on the height of the spacer.

In the embodiment of the invention shown in FIG. 19, the baking plate 6h is formed in its rear surface with an elongated recess. The thickness of the baking plate 6h between the bottom of that recess and the dough-treating surface 9 of the baking plate 6h corresponds to the thickness of the baking plate 6h between the bottom 11 of the channel 10i and the dough-treating surface 9 in the other embodiments of the invention. A spacer 30 is placed into that elongated recess and is secured to the bottom of that recess. Channels 10i are defined by the side faces of the spacer 30a and the side faces of the elongated recess. That spacer 30a protrudes above the rear surface of the baking plate 6h and is forced against the latter by a tightening of screws 28, by which a beamlike bridge member 27a is connected to the spacer 30a and to the baking plate 6h on opposite sides of the spacer beside the elongated recess. As a result, a camber is imparted to the dough-treating surface of the baking plate 6h. In this embodiment the bridge member 27a may be replaced by other embodiments of the stressing device described hereinbefore. In this embodiment, the camber of the baking plate 6h can be controlled by means of replaceable shims which are placed between the bridge member 27a and the spacer or between the bridge member 27a and the rear surface of the baking plate 6h or by means of inserts replaceably disposed in the channels 10i. Alternatively, the baking plate 6h may be bent until the channels 10i between the spacer 30a and the side faces of the elongated recess are closed; in that case the camber will depend on the height of the replaceable spacer 30a.

In the embodiment of the invention shown in FIG. 20, a stressing device shown, e.g., in FIG. 5 is provided above a channel 10 formed in an electrically heated baking plate. The channel 10 is disposed at the center of the baking plate 6i and is open toward the rear of the baking plate 6i. The baking plate 6i is formed in its rear surface with recesses, which accommodate wires 31 for electric heating. The rear surface of the baking plate is provided with a heat-insulating cover 32, which is covered by a metal plate 33. The heat-insulating cover 32 is interrupted adjacent to the stressing device. To compensate that interruption, the shims used with that stressing device may be made of heat-insulating material or the empty spaces left between the stressing device and the cambered baking plate may be filled with insulating material, or the stressing device may be covered by an insulated hood.

A flat baking plate may also be provided with a stressing device according to FIG. 14 so that there are no parts protruding from the rear surface of the baking plate. In that case an electric heater may consist, e.g., of an aluminum plate, in which heating elements are enclosed and which is connected by screws to the rear surface of the baking plate and then provided with a heat-insulating cover.

The baking plates shown in FIG. 20 are provided with hinges and locking bolts like those shown in FIG. 1 and together form baking tongs.

It will be understood that the invention is not restricted to the embodiments described by way of example but the inventive concept may be varied in numerous ways within the scope of the invention. For instance, the bottom of the channels formed in the baking plate may include an acute angle with the dough-treating surface of the baking plate so that the remaining thickness of the plate increases or decreases in one direction along the channel (FIG. 23). Besides, the channels may be open only to the rear of the baking plate and to one end face of the baking plate. The channels need not be straight but may be curved in dependence on the desired shape of the cambered baking plate or on the deformation of the baking plate which is to be compensated. Moreover, the channels may be subsequently formed in the baking plate by milling or the like operations or cast baking plates may be formed with the channels during the manufacture of the baking plates, e.g., during the casting thereof. For instance, the baking plate may be cast with the channel which is to be contracted by the stressing device. A baking plate which has a flat rear surface may be provided with a channel in that two additional plates defining the channel are secured to the rear surface of the baking plate. Such plates may serve to reinforce a thin baking plate.

The cross-sectional shape of the grooves, recesses, channels or the like formed in the rear surface of the baking plate may vary in dependence on the method by which the baking plate is made. In cast baking plates the side faces of the grooves, recesses or channels or the like will have downwardly converging side faces and a bottom which is rounded at least at its edges so that the resulting recess will be wedge-shaped in cross-section, as is shown in FIGS. 24 and 25. The cross-sectional shape of grooves, recesses, channels or the like which are subsequently formed by machining in a baking plate will depend on the cutting tool which is employed so that, e.g., narrow channels having parallel side walls and a bottom which is curved in dependence on the shape of the cutting tool may be obtained, as is shown in FIG. 26.

As shown in FIG. 27, dough-treating surface 9 of baking plate 6 may have recesses 34 for baking hollow wafers. Also, as shown in FIG. 28, the dough-treating surface may be engraved for baking wafter sheets.

A lower limit is imposed regarding the thickness of the baking plate under the channels or other recesses by the fact that the baking plate must withstand during the manufacturing process the stresses which are due to the manufacturing process. For baking plates having a size of 290×480 mm it has been found that a remaining thickness of 4 to 5 mm in baking plates of steel and of 8 to 10 mm in baking plates of cast iron is sufficient.

The cross-sectional shape of the anchoring members and of the bridge members may also be varied within the scope of the invention. For instance, the anchoring members may have a trapezoidal cross-sectional shape and the wedge surfaces of the bridge members may be parallel to the adjacent oblique surfaces of the anchoring members. In that case the camber of the baking plate may be controlled by the provision of shims between the mutually engaging surfaces of the anchoring members and the bridge member.

In all embodiments, the shims or inserts may be omitted and the camber of the baking plate may be determined only by the torque with which the screws are tightened.

Besides, one anchoring member may be intergral with the bridge member and the other anchoring member cooperating with the bridge member may be inserted in a groove formed in the rear surface of the baking plate or may be integral with said baking plate.

What is claimed is:

1. In a baking plate for cooperating with a second baking plate to define a cavity for receiving dough to be baked, which baking plate has on one side a generally flat dough-treating surface and on the opposite side a rear surface,
    the improvement residing in that
    said rear surface of said baking plate is formed with at least one channel,
    at least one adjustable stressing device is connected to said rear surface of said baking plate on opposite sides of said at least one channel and operable to subject said baking plate to an adjustable initial bending stress in such a manner that said channel is contracted to an adjustable extent transversely to the longitudinal direction of said channel and that an adjustable convex camber is imparted to said dough-treating surface.

2. The improvement set forth in claim 1, as applied to a self-supporting baking plate.

3. The improvement set forth in claim 1 as applied to a baking plate for cooperating with a second baking plate to form baking tongs for use in a wafer-baking oven.

4. The improvement set forth in claim 1 as applied to a baking plate in which said dough-treating surface is engraved for the baking of wafer sheets.

5. The improvement set forth in claim 1 as applied to a baking plate in which said dough-treating surface has recesses for the baking of hollow wafers.

6. The improvement set forth in claim 1 as applied to a baking plate which is formed on said rear surface with ribs.

7. The improvement set forth in claim 1, wherein said at least one stressing device is operable to subject said baking plate to such an initial bending stress that the reduction of the flexural stiffness of the baking plate which is due to said at least one channel is at least offset.

8. The improvement set forth in claim 1, wherein the remaining thickness of the baking plate between the bottom of said at least one channel and said dough-treating surface is at least 5% of the overall thickness of said baking plate.

9. The improvement set forth in claim 8 as applied to a baking plate in which said rear surface has substantially the configuration of a rectangle, wherein
the remaining thickness of said baking plate between the bottom of said at least one channel and said dough-treating surface is 0.01 to 0.2 time the length of one side of said rectangle.

10. The improvement set forth in claim 9, wherein said remaining thickness is 0.02 to 0.05 time the length of one side of said rectangle.

11. The improvement set forth in claim 1, wherein
said rear surface of said baking plate is formed with a plurality of said channels and
said baking plate has the same remaining thickness between the bottom of each of said channels and said dough-treating surface.

12. The improvement set forth in claim 1, wherein
said rear surface of said baking plate is formed with a plurality of said channels, which are transversely spaced apart in the direction from the center of the baking plate toward one edge of said baking plate, and
the remaining thickness of said baking plate between the bottom of each of said channels and said dough-treating surface changes from channel to channel in the same sense in the direction toward said one edge of said baking plate.

13. The improvement set forth in claim 12, wherein said remaining thickness increases in the direction toward said one edge of said baking plate.

14. The improvement set forth in claim 1, in which the bottom of said channel is substantially parallel to said dough-treating surface.

15. The improvement set forth in claim 1, wherein the remaining thickness of the baking plate between the bottom of the channel and the dough-treating surface varies along said channel.

16. The improvement set forth in claim 1, wherein said channel has a bottom-bisecting longitudinal center plane which intersects said dough-treating surface substantially at right angles thereto.

17. The improvement set forth in claim 1, wherein said channel has a bottom-bisecting longitudinal center plane which intersects said dough-treating surface at an acute angle therewith.

18. The improvement set forth in claim 1, wherein said rear surface of said baking plate is formed with two of said channels, which are parallel to each other and have bottom-bisecting longitudinal center planes which are inclined to said dough-treating surface in opposite senses.

19. The improvement set forth in claim 1, wherein the rear surface is formed with at least two of said channels, which have parallel bottom-bisecting longitudinal center planes.

20. The improvement set forth in claim 1 as applied to a self-supporting baking plate in which said rear surface has substantially the configuration of a rectangle and which is provided near one side of said rectangle with hinging means for hingedly connecting said baking plate to another baking plate and provided near the opposite side of said rectangle with locking means for interlocking said baking plate with said other baking plate, wherein
said at least one channel extends parallel to said sides of said rectangle.

21. The improvement set forth in claim 20, wherein the remaining thickness of the bottom plate between the bottom of said at least one channel and said dough-treating surface is 0.01 to 0.2 time the length of a third side of said rectangle.

22. The improvement set forth in claim 1 as applied to a baking plate in which said rear surface has substantially the configuration of a rectangle, wherein
said at least one channel extends substantially throughout the length of one side of said rectangle.

23. The improvement set forth in claim 22, wherein said at least one channel extends along and substantially throughout the length of a diagonal of said rectangle.

24. The improvement set forth in claim 22, wherein said rear surface of said baking plate is formed with at least one of said channels which extends substantially throughout the length of said one side.

25. The improvement set forth in claim 22, wherein said rear surface of said baking plate is formed with a plurality of said channels, each of which extends only over part of the length of said one side.

26. The improvement set forth in claim 25, wherein said channels are staggered relative to each other.

27. The improvement set forth in claim 1 as applied to a baking plate in which said rear surface has substantially the configuration of a rectangle, wherein
said at least one channel is parallel to one side of said rectangle.

28. The improvement set forth in claim 1 as applied to a baking plate in which said rear surface has substantially the configuration of a rectangle, wherein
said at least one channel includes an acute angle with one side of said rectangle.

29. The improvement set forth in claim 1, wherein
said rear surface of said baking plate is formed with a plurality of said channels, which extend longitudinally in a row and
said at least one stressing device comprises a single stressing device associated with the channels of said row.

30. The improvement set forth in claim 29, wherein the channels of said row are longitudinally aligned.

31. The improvement set forth in claim 1, wherein
said rear surface of said baking plate is formed with a plurality of said channels, which are juxtaposed, and
said at least one stressing device comprises a single stressing device associated with said juxtaposed channels.

32. The improvement set forth in claim 1, wherein a plurality of said stressing devices are associated with one of said channels.

33. The improvement set forth in claim 1, wherein said stressing device bridges one of said channels and is connected to said rear surface of said baking plate on opposite sides of said channel.

34. The improvement set forth in claim 33, wherein said channel has side faces and
said stressing device comprises tension screws extending through said side faces.

35. The improvement set forth in claim 1, wherein said baking plate is provided on its rear surface with at least one pair of abutments, which are disposed on opposite sides of said at least one channel and have engaging surfaces facing away from each other and said stressing device comprises at least one bridge member, which bridges said at least one channel disposed between said pair of abutments and has engaging surfaces facing each other and engaging said engaging surfaces of said respective abutments, said bridge member being operable to force said abutments toward each other so as to contract said at least one channel disposed between said abutments.

36. The improvement set forth in claim 35, wherein said baking plate is formed in said rear surface with at least one pair of anchoring recesses, which are disposed on opposite sides of said channel, and said abutments consist of at least one pair of anchoring members, which respectively extend in said anchoring recesses and are detachably mounted therein and positively connected to said baking plate.

37. The improvement set forth in claim 36, wherein each of said anchoring members consists of a cylindrical rod.

38. The improvement set forth in claim 36, wherein said recesses are rectangular in cross-section and said anchoring members are substantially parallelepipedic.

39. The improvement set forth in claim 35, wherein each of said abutments extends substantially throughout the length of said at least one channel disposed between said abutments.

40. The improvement set forth in claim 35, wherein said abutments have rounded edges, which are parallel to said at least one channel disposed between said recesses and face away from said channel and from said rear surface.

41. The improvement set forth in claim 35, wherein said bridge member comprises a tension screw extending through both said abutments.

42. The improvement set forth in claim 41, wherein said rear surface of said baking plate is formed with a transverse recess, which extends between said abutments across said at least one channel disposed between said two recesses and said tension screw extends in said transverse recess.

43. The improvement set forth in claim 42 as applied to a baking plate which is formed on said rear surface with a plurality of transversely spaced apart ribs, wherein said at least one channel extends across said ribs and said transverse recess is defined by two adjacent ones of said ribs.

44. The improvement set forth in claim 41, wherein a single tension screw is connected to said pair of abutments.

45. The improvement set forth in claim 41, wherein a plurality of pairs of abutments are provided on opposite sides of said at least one channel and a single tension screw is connected to each of said pairs of abutments.

46. The improvement set forth in claim 41, wherein a plurality of tension screws are connected to said pair of abutments.

47. The improvement set forth in claim 41, wherein said tension screw has two opposite end portions provided with oppositely handed screw threads screwthreadedly connected to respective ones of said abutments.

48. The improvement set forth in claim 35, wherein only one pair of said abutments are disposed on opposite sides of one of said channels.

49. The improvement set forth in claim 35, wherein said bridge member is formed on its surface facing the rear surface of said baking plate with a recess, which receives said abutments and is defined by said engaging surfaces of said bridge member.

50. The improvement set forth in claim 49, wherein said engaging surfaces of said bridge member and of said abutments are designed to cause said abutments to approach each other in response to a movement of said bridge member toward said dough-treating surface, and said stressing device comprises prestressing means for forcibly moving said bridge member relative to said abutments toward said dough-treating surface.

51. The improvement set forth in claim 50, wherein said engaging surfaces of said bridge member extend at an acute angle to said dough-treating surface and diverge toward said dough-treating surface.

52. The improvement set forth in claim 51, wherein said engaging surface of each of said abutments is parallel to the adjacent engaging surface of said bridge member.

53. The improvement set forth in claim 51, wherein said engaging surfaces of said abutments are convexly cambered.

54. The improvement set forth in claim 51, wherein said bridge member is provided with two projections, which are formed with said engaging surfaces of said bridge member, and at least one shim is detachably mounted between each of said projections and said rear surface of said baking plate on opposite sides of said abutments to limit the movement of said bridge member relative to said abutments toward said dough-treating surface.

55. The improvement set forth in claim 50, wherein said recess has a bottom, which constitutes stop means limiting the movement of said bridge member relative to said abutments toward said dough-treating surface.

56. The improvement set forth in claim 55, wherein said stop means comprise shims detachably mounted between the bottom of said recess and said abutments.

57. The improvement set forth in claim 50, wherein said baking plate is formed in said rear surface with two anchoring recesses, which are parallel to said at least one channel and extend on opposite sides thereof, each of said abutments is integral with said baking plate and defines one of said anchoring recesses on the side thereof which is adjacent to said at least one channel, and said bridge member is provided with two projections which are formed with said engaging surfaces of said bridge member and each of which protrudes into one of said anchoring recesses.

58. The improvement set forth in claim 57, wherein said prestressing means comprise screws threaded into said baking plate and means locking said screw against rotation.

59. The improvement set forth in claim 50, wherein said engaging surfaces of said abutments extend at an acute angle to said dough-treating surface and diverge toward said dough-treating surface.

60. The improvement set forth in claim 50, wherein said bridge-member is substantially C-shaped.

61. The improvement set forth in claim 50, wherein a single bridge member extends along said at least one channel.

62. The improvement set forth in claim 50, wherein said baking plate is formed in said rear surface with two of said channels, which are juxtaposed and said bridge member bridges said two channels.

63. The improvement set forth in claim 62, wherein said bridge member has opposite end portions protruding beyond both said two channels on opposite sides thereof and
said prestressing means connect said bridge member to said baking plate at said end portions and between said channels.

64. The improvement set forth in claim 63, wherein shims which limit the movement of said bridge member relative to said dough-treating surface are detachably mounted between said end portions of said bridge member and said rear surface of said baking plate.

65. The improvement set forth in claim 35, wherein stop means are provided which limit the movement of said bridge member relative to said abutments in a sense to force said abutments toward each other.

66. The improvement set forth in claim 65, wherein said stop means are provided on said bridge member.

67. The improvement set forth in claim 65, wherein said stop means are adjustable.

68. The improvement set forth in claim 65, wherein said stop means are detachably mounted on said baking plate.

69. The improvement set forth in claim 65, wherein said stop means comprise shims detachably mounted between said bridge member and said rear surface of said baking plate between said engaging surfaces of said abutments.

70. The improvement set forth in claim 65, wherein said stop means comprise at least one insert, which is detachably mounted in said at least one channel and limits the extent to which said channel can be contracted by said stressing device.

71. The improvement set forth in claim 35, wherein said bridge member is provided with two projections, which are formed with said engaging surfaces of said bridge member and engageable with said rear surface of said baking plate on opposite sides of said abutments to limit the movement of said bridge member relative to said abutments toward said dough-treating surface.

72. The improvement set forth in claim 35, wherein said bridge member extends throughout the length of said at least one channel.

73. The improvement set forth in claim 1, wherein said stressing device comprises
a platelike bridge member which bridges one of said channels,
spacing means disposed between said bridge member and the rear surface of said baking plate on the side of said channel, and
prestressing means connecting said bridging member to said rear surface of said baking plate on opposite sides of said channel and operable to contract said at least one channel.

74. The improvement set forth in claim 1 as applied to a baking plate which is formed on said rear surface with a plurality of transversely spaced apart ribs, wherein
said at least one channel extends across said ribs,
said baking plate is provided on its rear surface with at least one pair of abutments, which are disposed on opposite sides of said at least one channel and have engaging surfaces facing away from each other and
said stressing device comprises at least one bridge member, which bridges said at least one channel disposed between said pair of abutments and has engaging surfaces facing each other and engaging said engaging surfaces of said respective abutments, said bridge member being operable to force said abutments toward each other so as to contract said at least one channel disposed between said abutments and prestressing means for forcibly moving said bridge member relative to said abutments toward said dough-treating surface, and
said ribs protrude from said rear surface of said baking plate beyond said bridge member and said prestressing means.

* * * * *